United States Patent [19]
Fujita

[11] Patent Number: 4,975,772
[45] Date of Patent: Dec. 4, 1990

[54] IMAGE PROCESSING METHOD AND SYSTEM FOR AFTERIMAGE REDUCTION

[75] Inventor: Hitoshi Fujita, Ootawara, Japan

[73] Assignee: Kabushiki Kaisha Toshiba, Kawasaki, Japan

[21] Appl. No.: 346,669

[22] Filed: May 3, 1989

[30] Foreign Application Priority Data

May 12, 1988 [JP] Japan .................................. 63-115337

[51] Int. Cl.⁵ ........................ H04N 5/213; H04N 9/64
[52] U.S. Cl. .................................... 358/166; 358/167; 358/36; 358/37
[58] Field of Search ................... 358/140, 88, 105, 91, 358/92, 111, 166, 167, 36, 37

[56] References Cited

U.S. PATENT DOCUMENTS

| | | | |
|---|---|---|---|
| 4,268,855 | 5/1981 | Takahashi | 358/167 |
| 4,490,744 | 12/1984 | Levine | 358/213.24 |
| 4,510,528 | 4/1985 | Bergen | 358/213.24 |
| 4,578,802 | 3/1986 | Itoh | 378/41 |
| 4,581,651 | 4/1986 | Miyata et al. | 358/213.24 |
| 4,682,212 | 7/1987 | Inuiya et al. | 358/44 |
| 4,772,944 | 9/1988 | Yoshimura | 358/88 |
| 4,833,537 | 5/1989 | Takeuchi et al. | 358/167 |
| 4,860,104 | 8/1989 | Katsuyama | 358/167 |
| 4,862,873 | 9/1989 | Yajima et al. | 358/98 |

FOREIGN PATENT DOCUMENTS

| | | |
|---|---|---|
| 55-132192 | 10/1980 | Japan . |
| 57-146219 | 9/1982 | Japan . |
| 57-146220 | 9/1982 | Japan . |
| 61-16732 | 1/1986 | Japan . |
| 61-37138 | 2/1986 | Japan . |
| 62-61493 | 3/1987 | Japan . |
| 62-102738 | 5/1987 | Japan . |
| 62-227319 | 5/1987 | Japan . |
| 62-230194 | 10/1987 | Japan . |
| 63-244992 | 10/1988 | Japan . |
| 63-247879 | 10/1988 | Japan . |
| 64-6596 | 2/1989 | Japan . |

*Primary Examiner*—John K. Peng
*Attorney, Agent, or Firm*—Finnegan, Henderson, Farabow, Garrett, and Dunner

[57] ABSTRACT

The present invention relates to an image processing system for afterimage reduction for suitable use in a stereoscopic television apparatus. This system has been devised in consideration of the fact that the afterimage in a TV camera image to be displayed is most influenced by a frame image previous to the image to be displayed. The afterimage can be reduced by performing a novel algorism operation on each pixel value. Pixel values of a right image stored in a second input frame memory, which has been output from the TV camera prior to a left image to be displayed which is supplied from an input selector, is multiplied by a predetermined coefficient. The multiplied value is subtracted from pixel values of the left image to be displayed. Thus, a left image to be displayed, which has been subjected to afterimage reduction processing, is produced, and stored in a first output frame memory. Similarly, a right image to be displayed, which has been subjected to afterimage reduction processing, is produced.

24 Claims, 14 Drawing Sheets

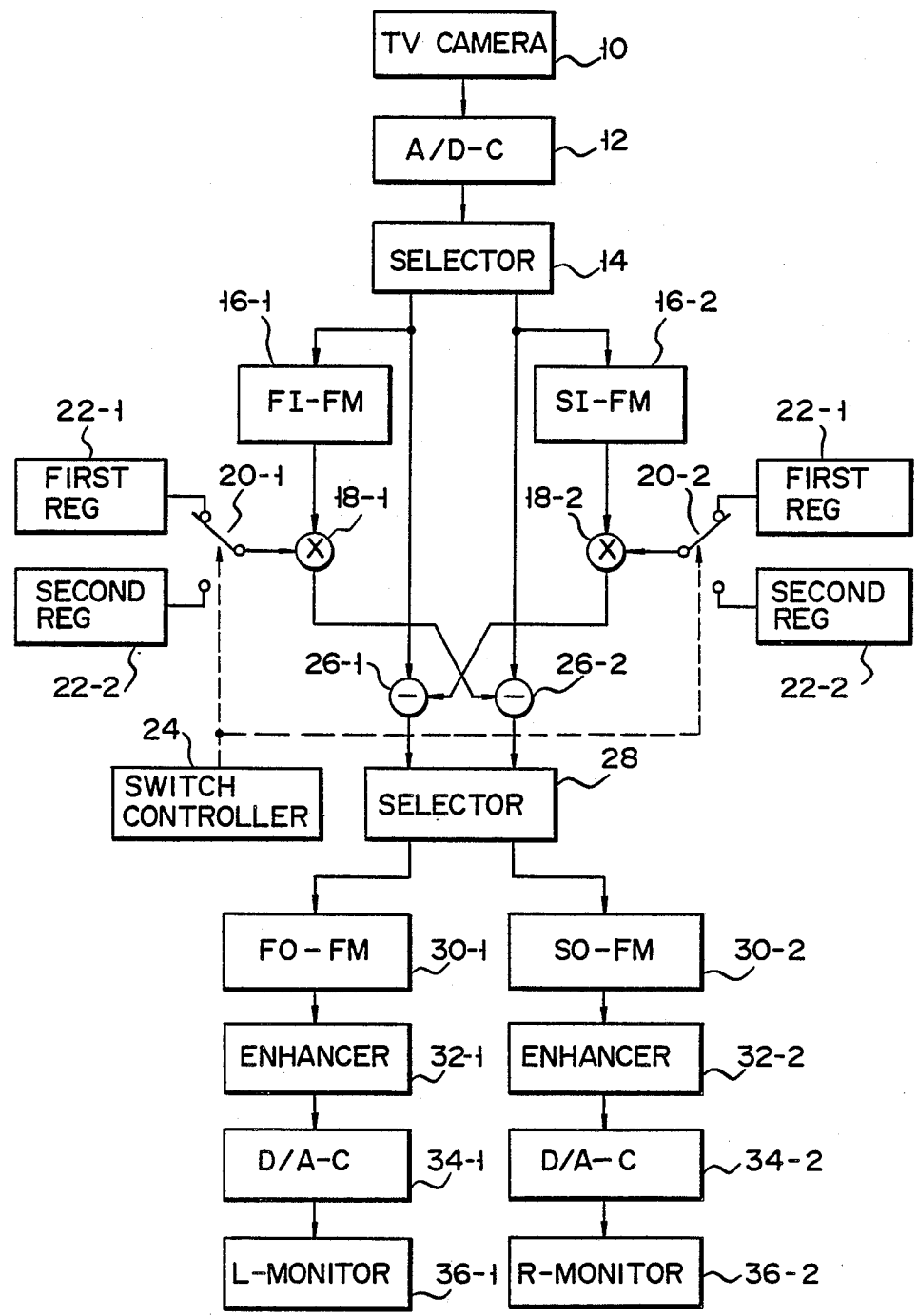
F I G. 1

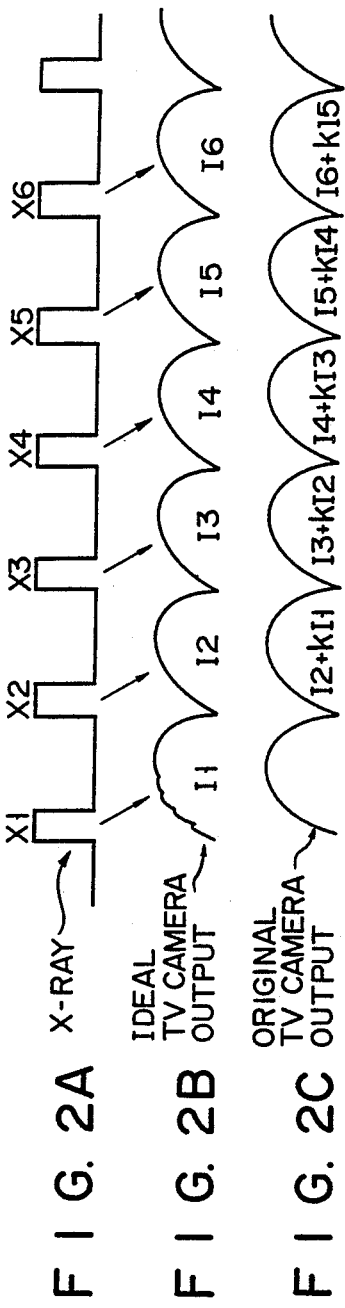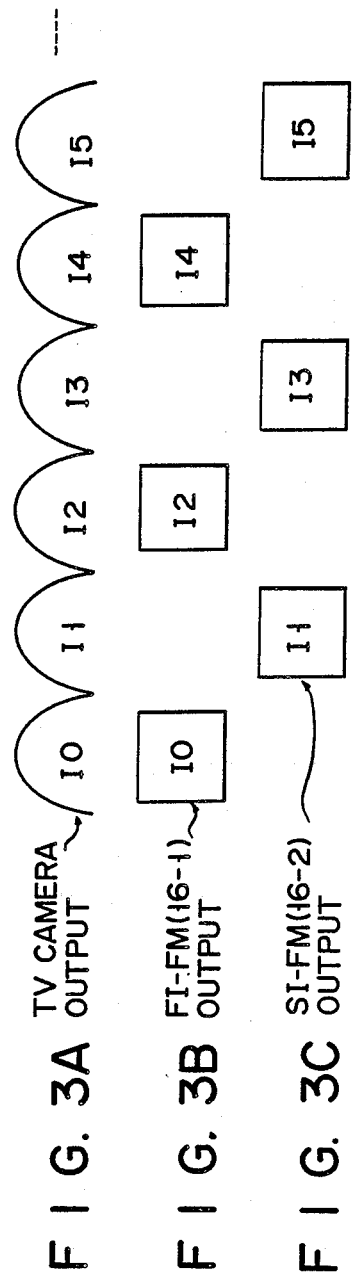

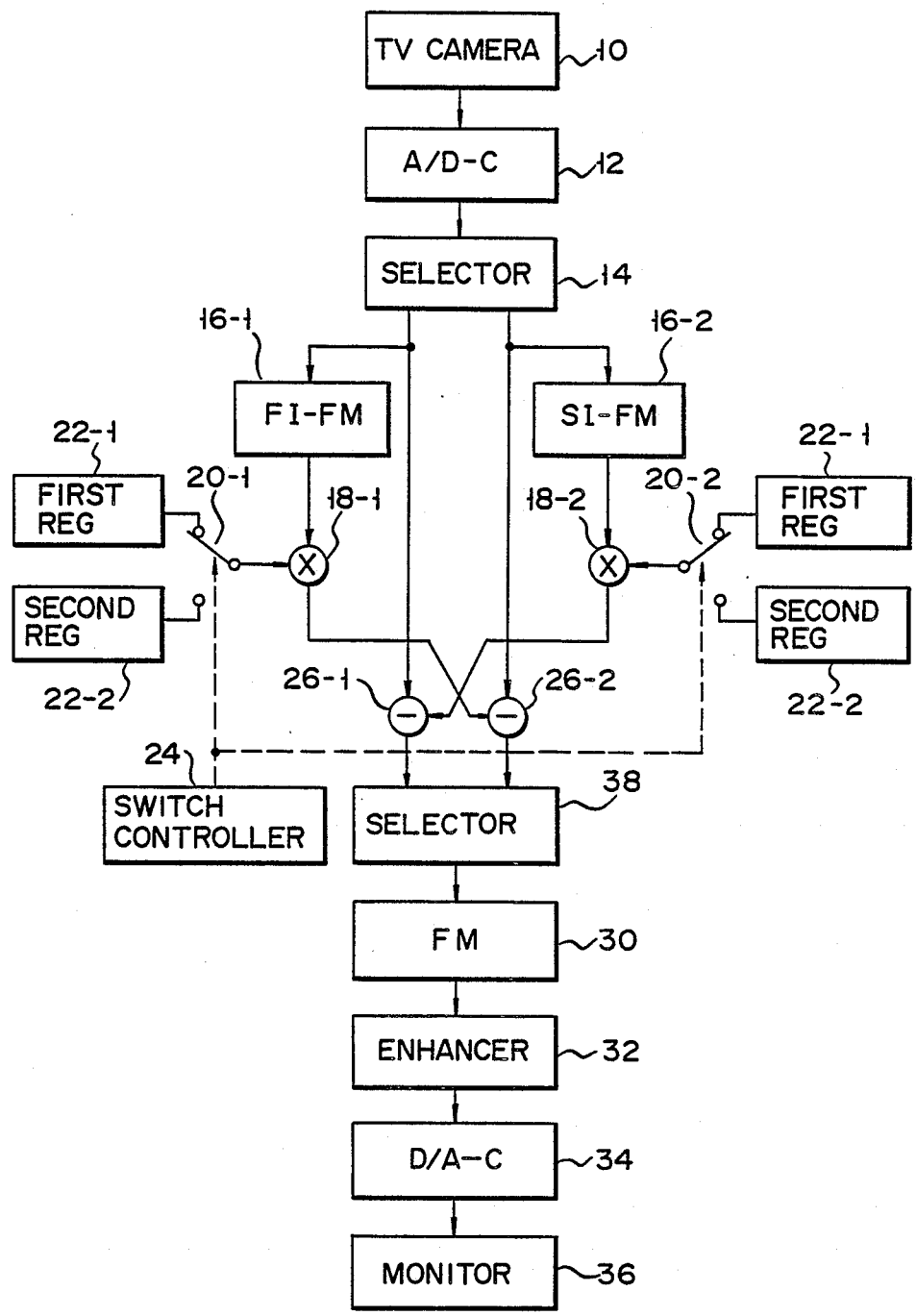
F I G. 4

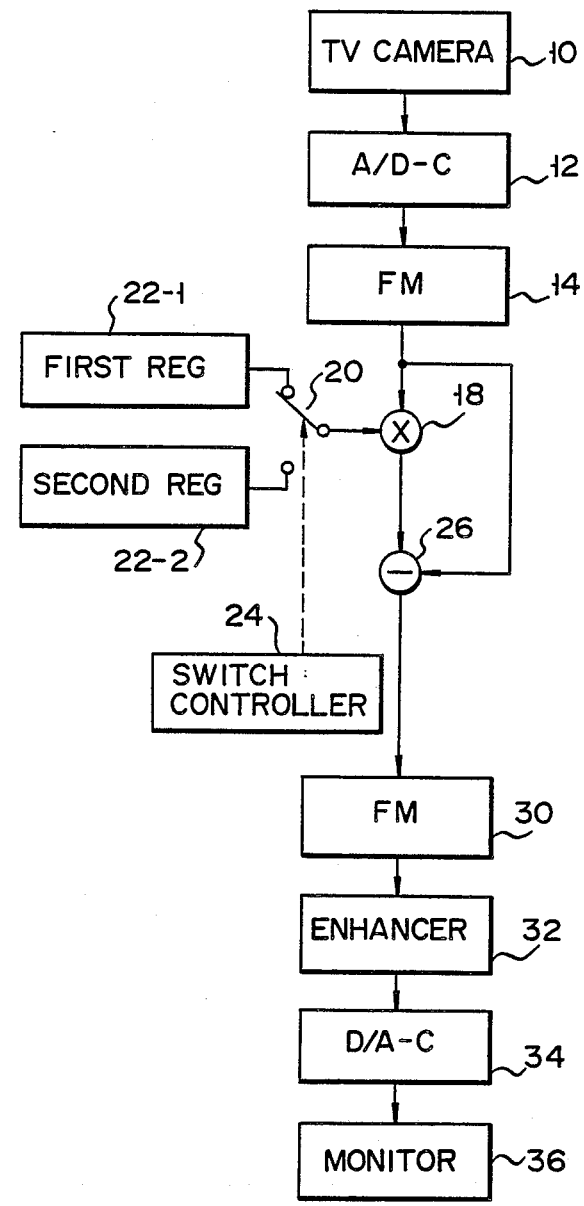
F I G. 5

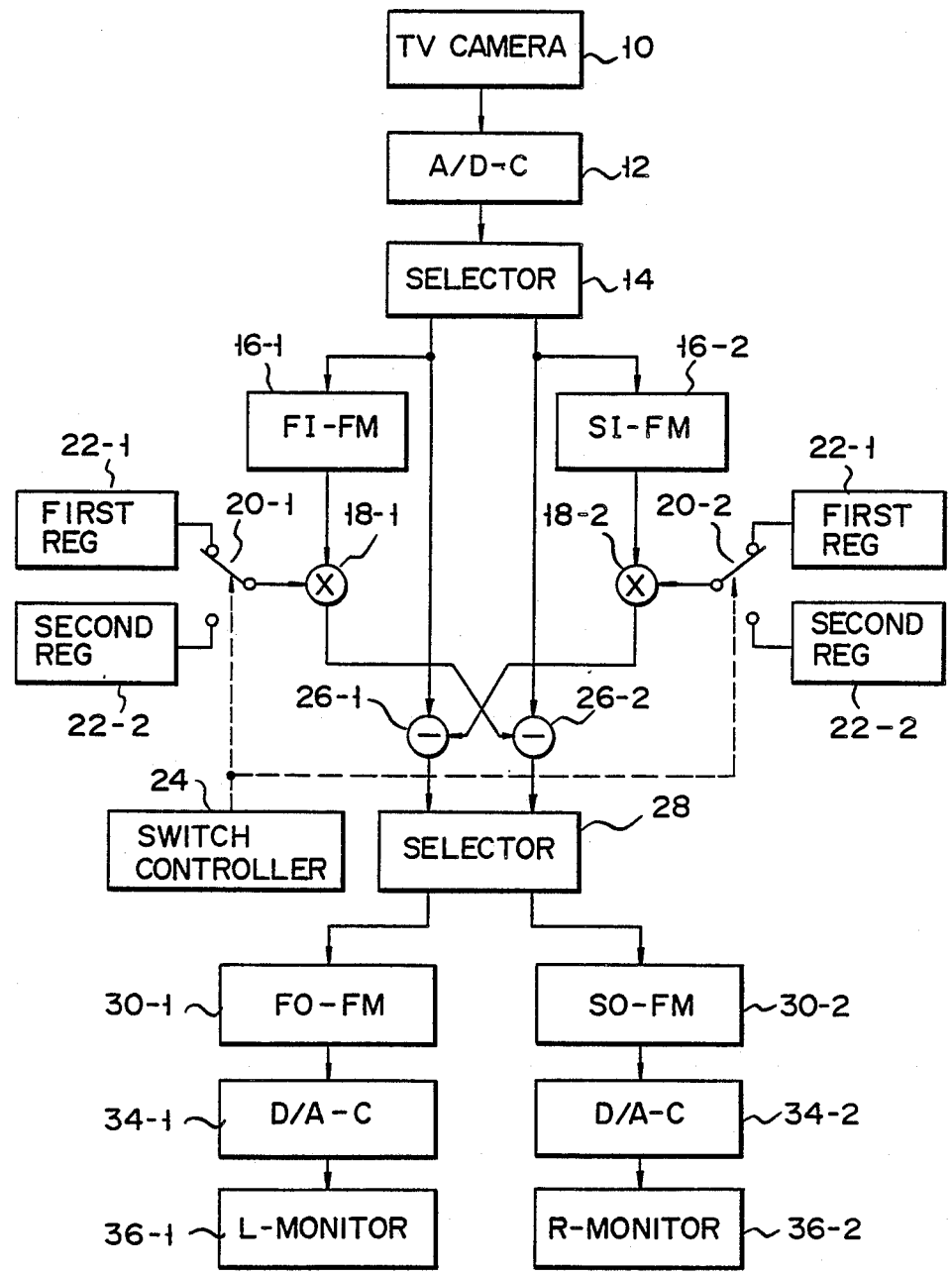
F I G. 6

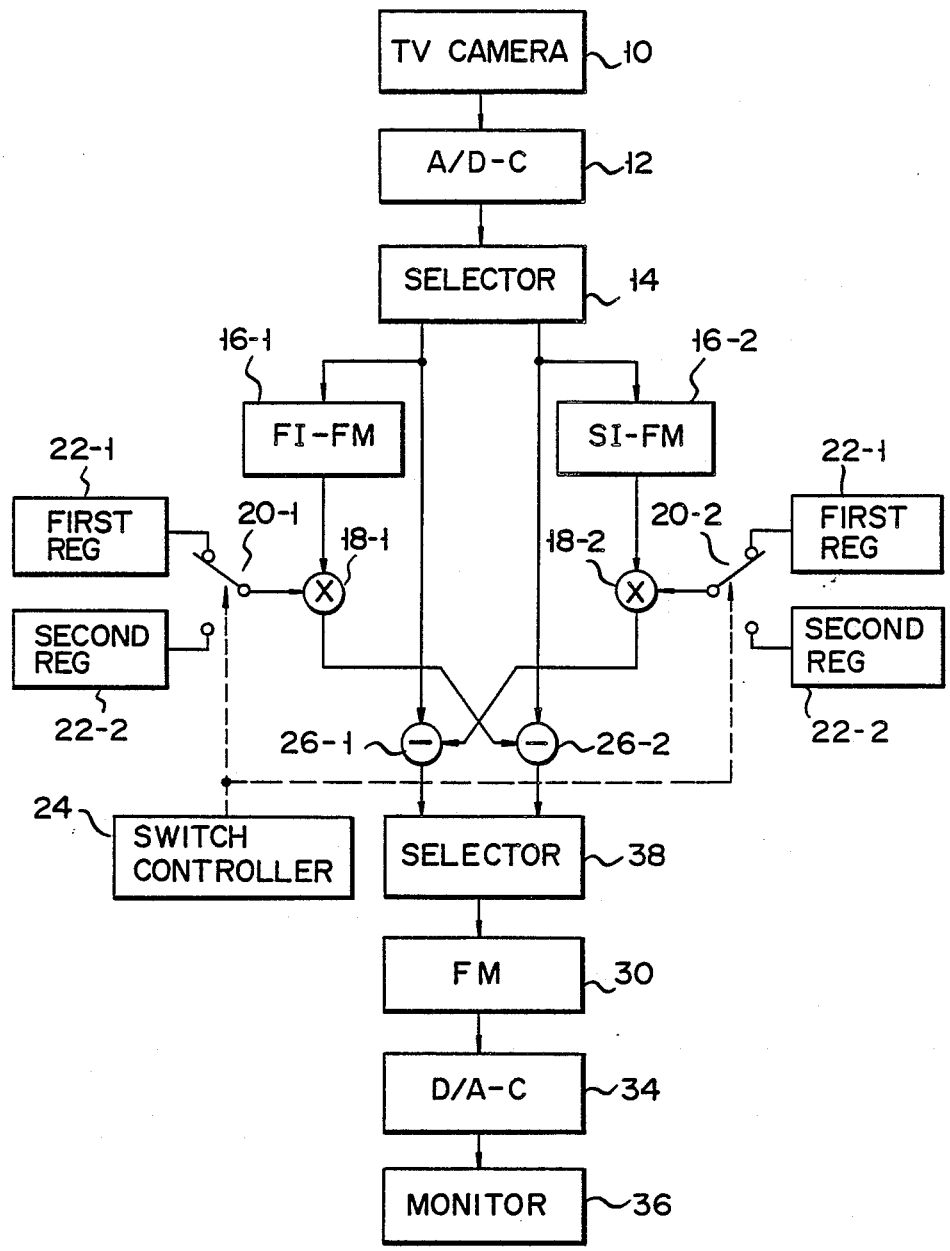
F I G. 7

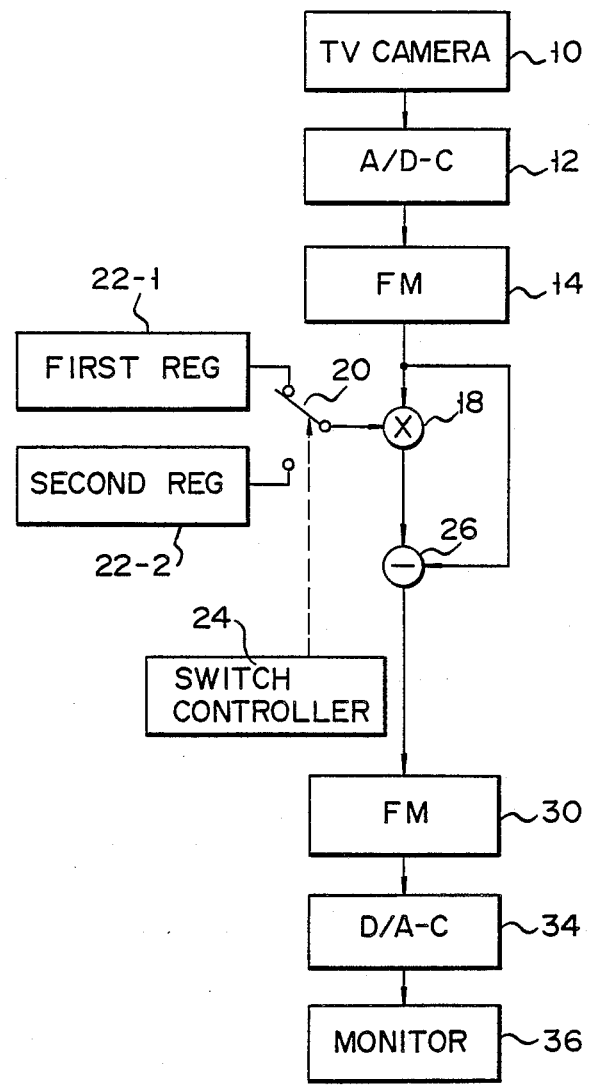
F I G. 8

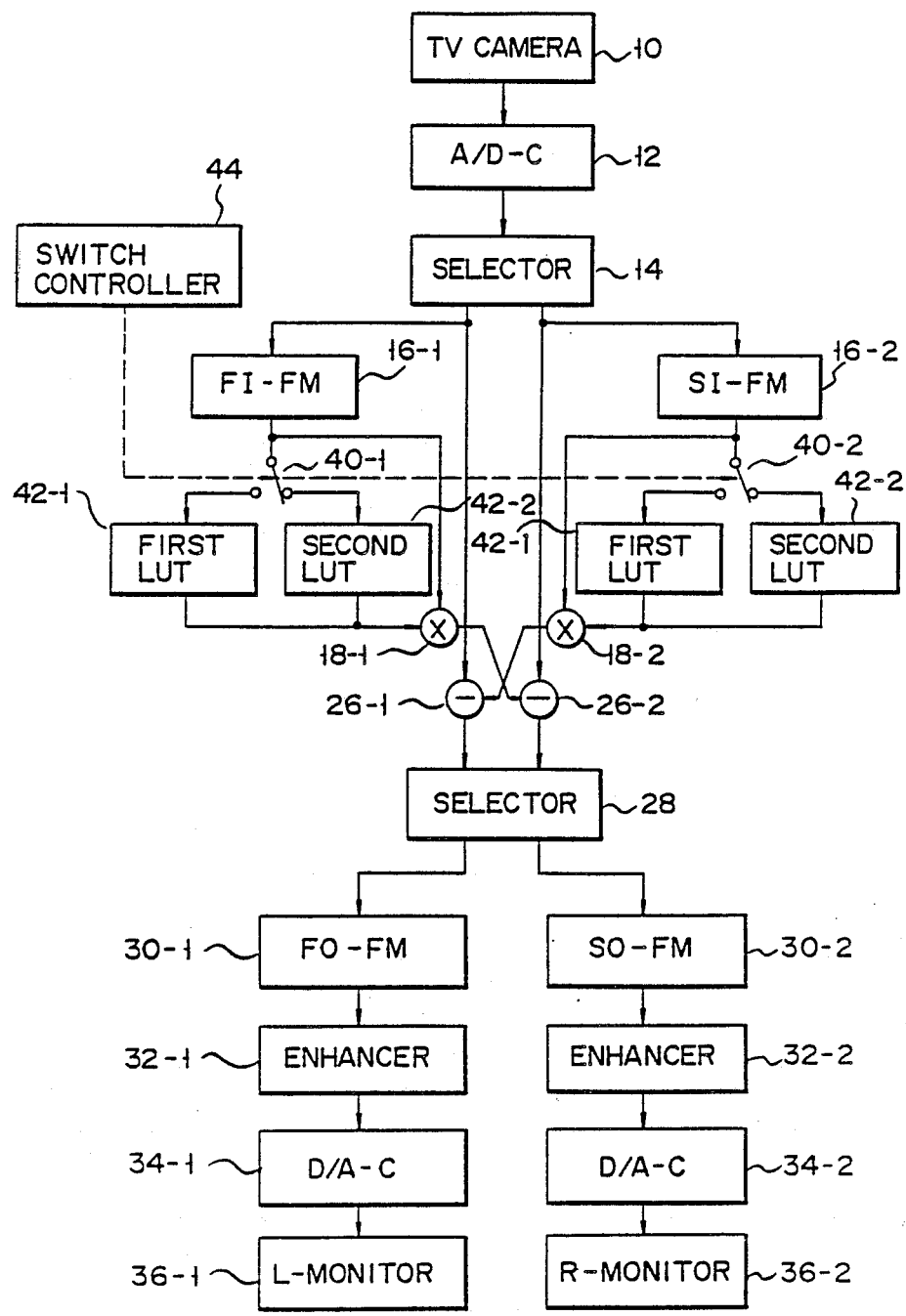
F I G. 9

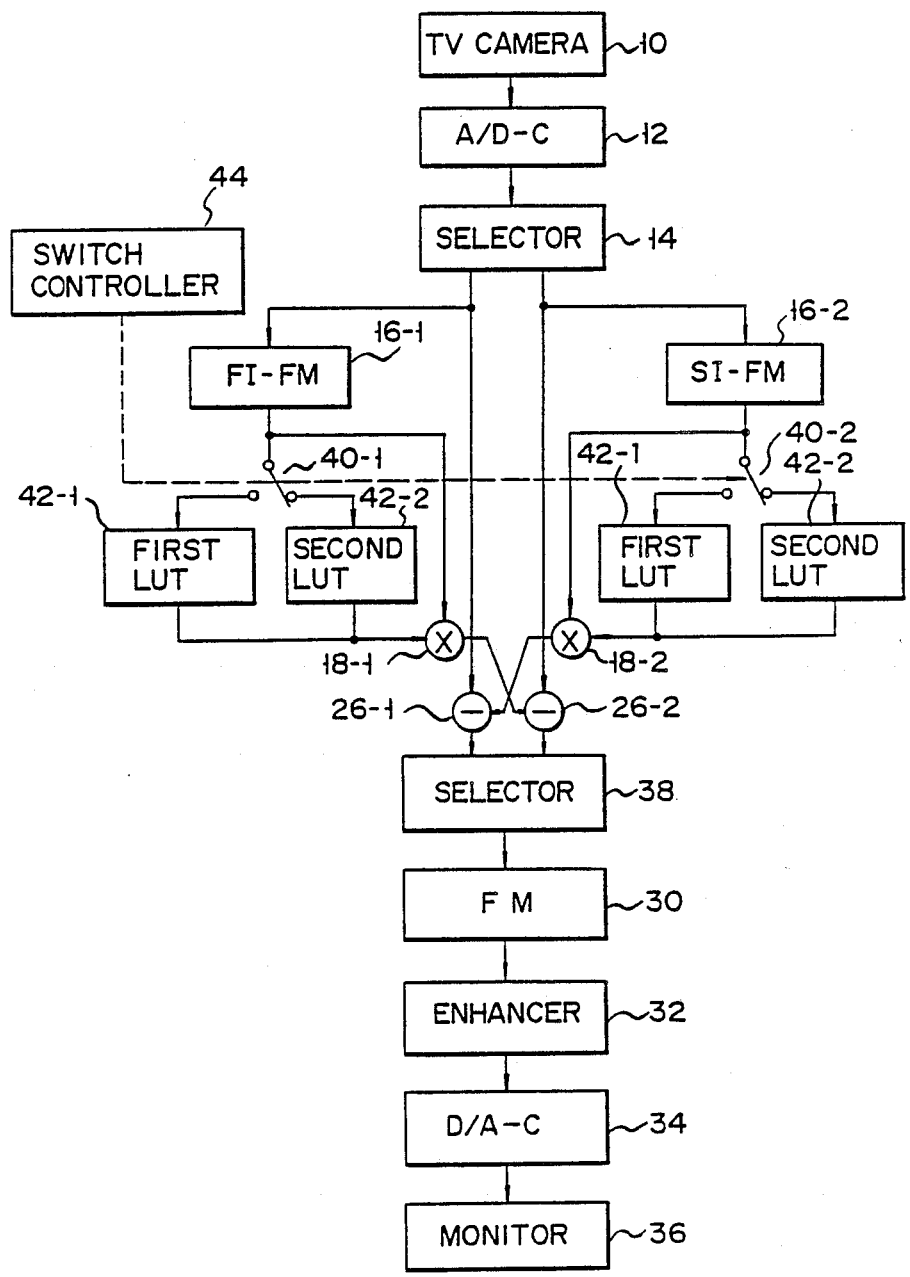
F I G. 11

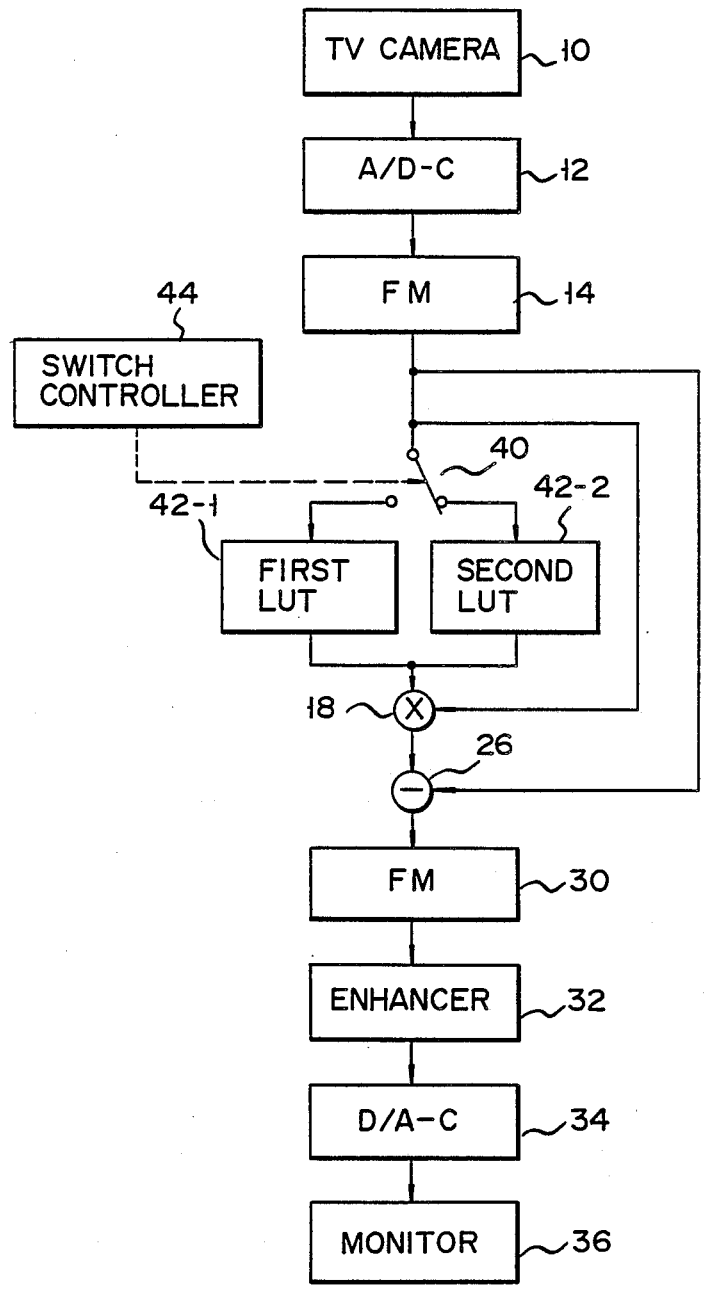
F I G. 12

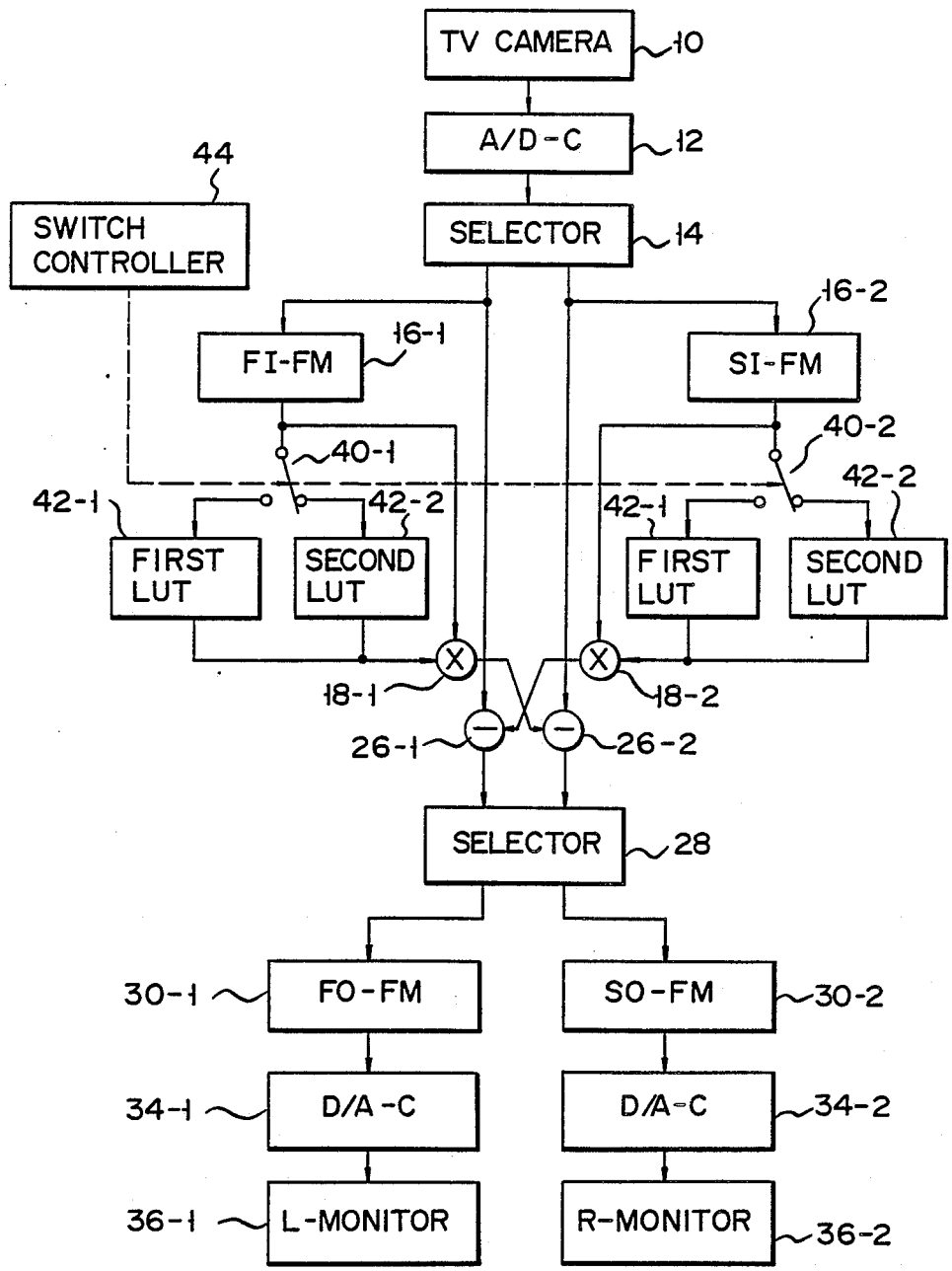
F I G. 13

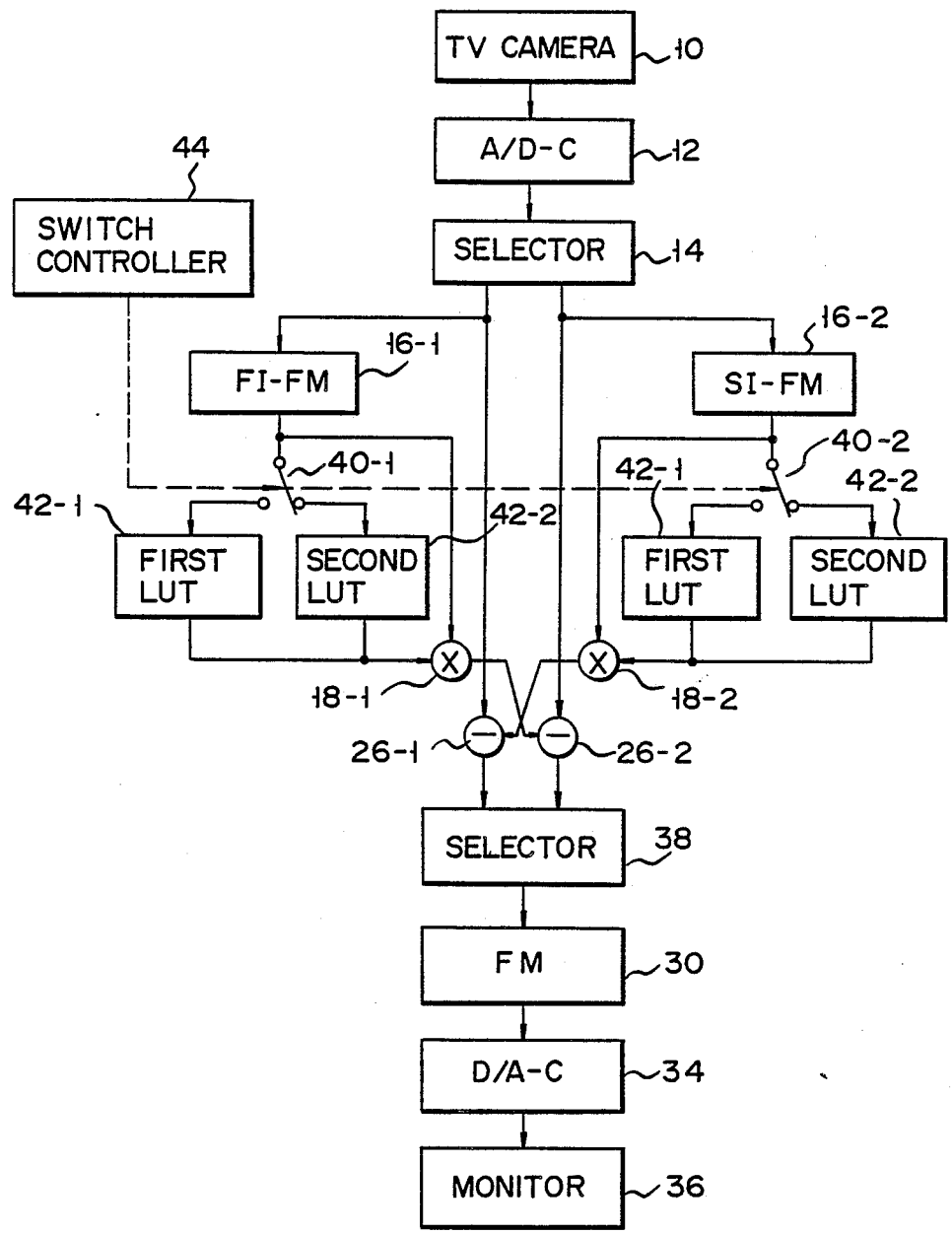
F I G. 14

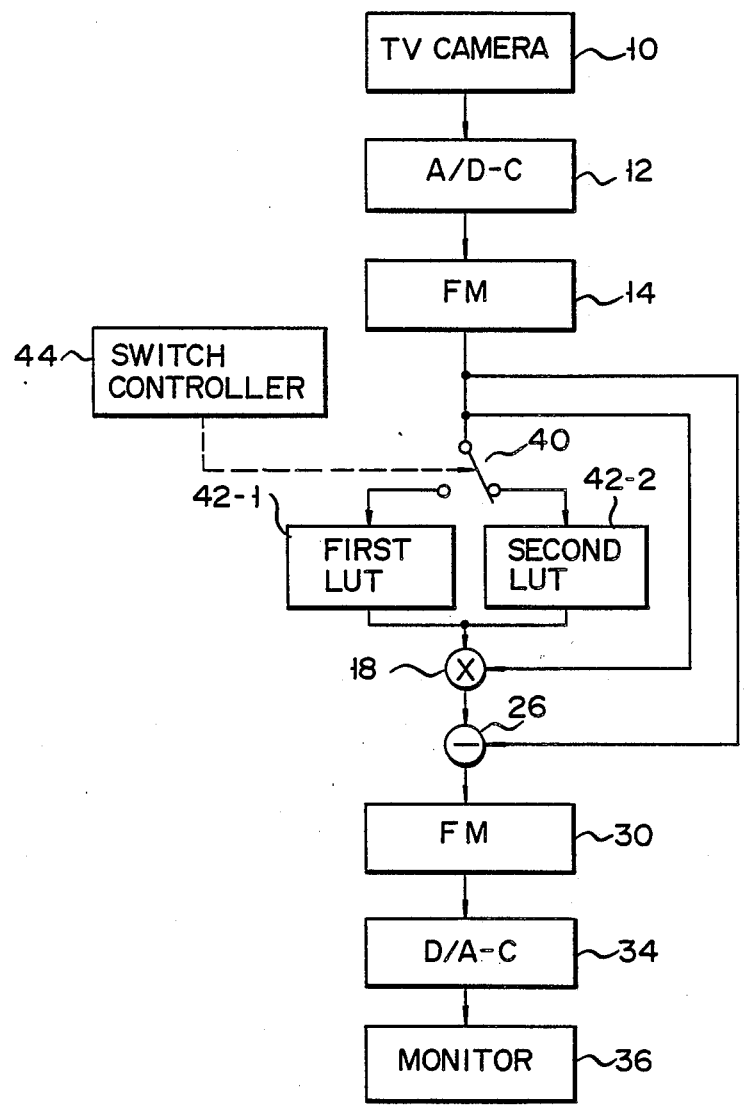
F I G. 15

IMAGE PROCESSING METHOD AND SYSTEM FOR AFTERIMAGE REDUCTION

BACKGROUND OF THE INVENTION

1. Field of the Invention

The present invention relates to an image processing method and a system for afterimage reduction.

2. Description of the Related Art

In the diagnosis of a circulatory system, for example, useful diagnostic data can be obtained by using an X-ray TV apparatus Images of a rapidly movable organ such as a heart are sequentially collected and displayed on the TV apparatus. The imaging is performed using high-speed collection and stereo collection, or the images are displayed in a stereoscopic manner, so that the movement and positional relationship of such an organ can be observed more effectively.

An afterimage effect, which is inherent to a TV camera, becomes conspicuous in the case of high-speed collection of images or stereoscopic collection of the images. A ghost image is superposed on an actual image, owing to the afterimage effect.

SUMMARY OF THE INVENTION

The object of the present invention is to provide an image processing method and a system for afterimage reduction, wherein an afterimage effect can be effectively reduced.

The object of the present invention can be achieved by an image processing method for afterimage reduction, comprising the steps of:

multiplying, by a predetermined coefficient, pixel values of a frame image, which is one of frame images sequentially output from a Tv camera system in a digital form and is, at least, a previous one to a frame image to be displayed; and subtracting the obtained multiplied value from all corresponding pixel values of the frame image to be displayed, thus producing a frame image to be displayed, which has been subjected to afterimage reduction processing.

The object of the invention can also be achieved by an image processing system for afterimage reduction, comprising:

an input selector for alternatively outputting frame images sequentially output from a TV camera system in a digital form, as a right image or a left image;

a first input frame memory for storing the left image distributed by said input selector;

a second input frame memory for storing the right image distributed by the input selector;

coefficient storing means for storing at least one coefficient;

a first multiplier for multiplying each pixel value of the left image stored in the first input frame memory by one of the coefficients stored in the coefficient storing means;

a second multiplier for multiplying each pixel value of the right image stored in the second input frame memory by one of the coefficients stored in the coefficient storing means;

a first subtracter for subtracting an output value of the second multiplier from corresponding pixel values of the left image to be displayed, which is supplied from the input selector;

a second subtracter for subtracting an output value of the first multiplier from corresponding pixel values of the right image to be displayed, which is supplied from the input selector;

an output selector for distributing an output value of the first subtracter and an output value of the second subtracter to the left image and the right image, on a frame-by-frame basis;

a first output frame memory for storing the left image of each frame output from the output selector; and a second output frame memory for storing the right image of each frame output from the output selector.

The object of the invention can also be achieved by an image processing system for afterimage reduction, comprising:

an input selector for alternatively outputting frame images sequentially output from a TV camera system in a digital form, as a right image or a left image;

a first input frame memory for storing the left image distributed by the input selector;

a second input frame memory for storing the right image distributed by the input selector;

coefficient storing means for storing at least one coefficient;

a first multiplier for multiplying each pixel value of the left image stored in the first input frame memory by one of the coefficients stored in the coefficient storing means;

a second multiplier for multiplying each pixel value of the right image stored in the second input frame memory by one of the coefficients stored in the coefficient storing means;

a first subtracter for subtracting an output value of the second multiplier from corresponding pixel values of the left image to be displayed, which is supplied from the input selector;

a second subtracter for subtracting an output value of the first multiplier from corresponding pixel values of the right image to be displayed, which is supplied from the input selector;

an output selector for receiving and distributing an output value of the first subtracter and an output value of the second subtracter to a right image field and a left image field which form a frame image to be displayed; and an output frame memory for storing the right image field and the left image field output from the output selector.

The object of the invention can also be achieved by an image processing system for afterimage reduction, comprising:

an input frame memory for storing a frame image, which is one of frame images sequentially output from a TV camera system in a digital form and is, at least, a previous one to a frame image to be displayed;

coefficient storing means for storing at least one coefficient;

a multiplier for multiplying pixel values of the image stored in the input frame memory by one of the coefficients stored in the coefficient storing means;

a subtracter for subtracting an output value of the multiplier from corresponding pixel values of the image to be displayed, which is supplied from the input frame memory; and an output frame memory for storing an output value of the subtracter with respect to each frame image The object of the invention can also be achieved by an image processing method for afterimage reduction, comprising the steps of:

multiplying each pixel value of a pixel area of a frame image, which is one of frame images sequentially output from a TV camera system in a digital form and is, at least, a previous one to a frame image to be displayed, by a coefficient which is definitely determined by the pixel value; and subtracting the multiplied value from all pixel values of the pixel area of the frame image to be displayed, thus obtaining a frame image to be displayed, which has been subjected to afterimage reduction processing.

The object of the invention can also be achieved by an image processing system for afterimage reduction, comprising:

an input selector for alternatively outputting frame images sequentially output from a TV camera system in a digital form, as a right image or a left image;

a first input frame memory for storing the left image distributed by the input selector;

a second input frame memory for storing the right image distributed by the input selector;

coefficient storing means for storing at least one coefficient data group in the form of a look-up table, such that one coefficient is definitely determined in relation to one input pixel value of a pixel area;

a first multiplier for retrieving the coefficient stored in the coefficient storing means in accordance with the pixel values of the pixel area of the left image stored in the first input frame memory, and multiplying the pixel values of the pixel area by the retrieved coefficient;

a second multiplier for retrieving the coefficient stored in the coefficient storing means in accordance with the pixel values of the pixel area of the right image stored in the second input frame memory, and multiplying the pixel values of the pixel area by the retrieved coefficient;

a first subtracter for subtracting an output value of the second multiplier from each pixel value of the left image to be displayed, which is supplied from the input selector;

a second subtracter for subtracting an output value of the first multiplier from each pixel value of the right image to be displayed, which is supplied from the input selector;

an output selector for distributing an output value of the first subtracter and an output value of the second subtracter to the right image and the left image, on a frame-by-frame basis;

a first output frame memory for storing the left image of each frame output from the output selector; and a second output frame memory for storing the right image of each frame output from the output selector.

The object of the invention can also be achieved by an image processing system for afterimage reduction, comprising:

an input selector for alternatively outputting frame images sequentially output from a TV camera system in a digital form, as a right image or a left image;

a first input frame memory for storing the left image distributed by said input selector;

a second input frame memory for storing the right image distributed by the input selector;

coefficient storing means for storing at least one coefficient data group in the form of a look-up table, such that one coefficient is definitely determined in relation to one input pixel value of a pixel area;

a first multiplier for retrieving the coefficient stored in the coefficient storing means in accordance with the pixel values of the pixel area of the left image stored in the first input frame memory, and multiplying the pixel values of the pixel area by the retrieved coefficient;

a second multiplier for retrieving the coefficient stored in the coefficient storing means in accordance with the pixel values of the pixel area of the right image stored in the second input frame memory, and multiplying the pixel values of the pixel area by the retrieved coefficient;

a first subtracter for subtracting an output value of the second multiplier from each pixel value of the left image to be displayed, which is supplied from the input selector;

a second subtracter for subtracting an output value of the first multiplier from each pixel value of the right image to be displayed, which is supplied from the input selector;

an output selector for receiving and distributing an output value of the first subtracter and an output value of the second subtracter to a right image field and a left image field which form a frame image; and an output frame memory for storing the right image field and the left image field output from the output selector.

The object of the invention can also be achieved by an image processing system for afterimage reduction, comprising:

an input frame memory for storing a frame image, which is one of frame images sequentially output from a TV camera system in a digital form and is, at least, previous one to a frame image to be displayed;

coefficient storing means for storing at least one coefficient data group in the form of a look-up table, such that one coefficient is definitely determined in relation to one input pixel value of a pixel area;

a multiplier for retrieving the coefficient stored in the coefficient storing means in accordance with the pixel values of the pixel area of the image stored in the input frame memory, and multiplying the pixel values of the pixel area by the retrieved coefficient;

a subtracter for subtracting an output value of the multiplier from each pixel value of the image to be displayed, which is supplied from the input frame memory; and an output frame memory for receiving an output value of the subtracter and storing the frame image to be displayed.

The method and system of the present invention have been devised in consideration of the fact that the afterimage in an image to be displayed is most influenced by an image, which is, at least, a previous one to the image to be displayed. By subtracting a predetermined signal component from the image to be displayed, an image free from afterimage can be displayed on a monitor.

BRIEF DESCRIPTION OF THE DRAWINGS

FIG. 1 is a block diagram showing an example of an image processing system for afterimage reduction, which is related to a first method of the present invention and is built in a twin monitor type stereoscopic television apparatus;

FIGS. 2A to 2C are timing charts showing the principle of a method of the present invention;

FIGS. 3A to 3C are timing charts showing the operation of the apparatus of FIG. 1;

FIG. 4 is a block diagram showing another example of an image processing system for afterimage reduction, which is related to the first method of this invention and is built in a single monitor type stereoscopic television apparatus;

FIG. 5 is a block diagram showing still another example of an image processing system for afterimage reduction, which is related to the first method of the present invention and is built in a display apparatus for high-speed movable subject display apparatus;

FIG. 6 is a block diagram showing a modification of the structure shown in FIG. 1;

FIG. 7 is a block diagram showing a modification of the structure shown in FIG. 4;

FIG. 8 is a block diagram showing a modification of the structure shown in FIG. 5;

FIG. 9 is a block diagram showing an example of an image processing system for afterimage reduction, which is related to a second method of the present invention and is built in a twin monitor type stereoscopic television apparatus;

FIG. 11 a block diagram showing another example of an image processing system for afterimage reduction, which is related to the second method of this invention and is built in a single monitor type stereoscopic television apparatus;

FIG. 12 is a block diagram showing still another example of an image processing system for afterimage reduction, which is related to the second method of the present invention and is built in a display apparatus for high-speed movable subject;

FIG. 13 is a block diagram showing a modification of the structure shown in FIG. 9;

FIG. 14 is a block diagram showing a modification of the structure shown in FIG. 11; and FIG. 15 is a block diagram showing a modification of the structure shown in FIG. 12.

DETAILED DESCRIPTION OF THE PREFERRED EMBODIMENTS

Figure 10:
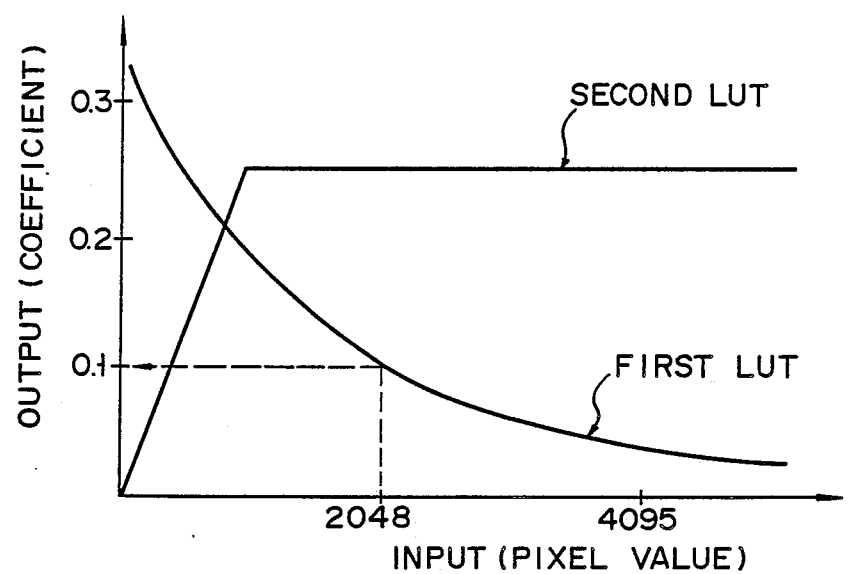
FIG. 10 is a graph showing the contents of a look-up table (LUT) in the apparatus of FIG. 9.

FIG. 1 is a block diagram showing an example of an image processing system for afterimage reduction, which is related to a method of the present invention and is built in a twin monitor type stereoscopic television apparatus.

As shown in FIG. 1, an output terminal of TV camera 10 built in an X-ray apparatus (not shown) is connected to an input terminal of A/D converter 12. The X-ray apparatus includes a twin focus type X-ray tube for stereo radiography. An output terminal of A/D converter 12 is connected to an input terminal of input selector 14 for distributing a frame image, which is one of frame images sequentially output from TV camera 10 and is, at least, a previous one to a frame image to be displayed, to a right image or a left image.

One output terminal of input selector 14 is connected to an input terminal of first input frame memory 16-1, which retains the left image divided by input selector 14.

The other output terminal of input selector 14 is connected to an input terminal of second input frame memory 16-2, which retains the right image divided by input selector 14.

An output terminal of first input frame memory 16-1 is connected to one input terminal of first multiplier 18-1. The other input terminal of first multiplier 18-1 is connected to a common terminal of first switch 20-1. A first change-over terminal of first switch 20-1 is connected to first register 22-1, and a second change-over terminal of first switch 20-1 is connected to second register 22-2.

An output terminal of second input frame memory 16-2 is connected to one input terminal of second multiplier 18-2. The other input terminal of second multiplier 18-2 is connected to a common terminal of second switch 20-2. A first change-over terminal of second switch 20-2 is connected to first register 22-2, and a second change-over terminal of second switch 20-2 is connected to second register 22-2.

First switch 20-1 and second switch 20-2 are operated by switch controller 24.

First multiplier 18-1 multiplies each pixel of the left image retained by first input frame memory 16-1 by a coefficient stored in selected one of first register 22-1 and second register 22-2.

Second multiplier 18-2 multiplies each pixel of the right image retained by second input frame memory 16-2 by a coefficient stored in selected one of first register 22 1 and second register 22-2.

One output terminal of input selector 14 is connected to one input terminal of first subtracter 26-1. An output terminal of second multiplier 18-2 is connected to the other input terminal of first subtracter 26-1. The other output terminal of input selector 14 is connected to one input terminal of second subtracter 26-2. An output terminal of first multiplier 18-1 is connected to the other input terminal of second subtracter 26-2.

An output terminal of first subtracter 26-1 is connected to one input terminal of output selector 28, and an output terminal of second subtracter 26-2 is connected to the other input terminal of output selector 28.

First subtracter 26-1 subtracts an output value of second multiplier 18-2 from pixels corresponding to the left image to be displayed, which is supplied from input selector 14. On the other hand, second subtracter 26-2 subtracts an output value of first multiplier 18-1 from pixels corresponding to the right image to be displayed, which is supplied from input selector 14.

One output terminal of output selector 28 is connected to an input terminal of first output frame memory 30-1, and the other output terminal of output selector 28 is connected to an input terminal of second output frame memory 30-2. Output selector 28 distributes an output value of first subtracter 26-1 and an output value of second subtracter 26-2 to the left image and right image, frame by frame.

An output terminal of first output frame memory 30-1 is connected to an input terminal of enhancer 32-1. An output terminal of enhancer 32-1 is connected to an input terminal of D/A converter 34-1 An output terminal of D/A converter 34-1 is connected to an input terminal of left image monitor 36-1.

An output terminal of second output frame memory 30-2 is connected to an input terminal of enhancer 32-2. An output terminal of enhancer 32-2 is connected to an input terminal of D/A converter 34-2. An output terminal of D/A converter 34-2 is connected to an input terminal of right image monitor 36-2.

Twin monitoring means is constituted by enhancer 32-1, D/A converter 34-1, left image monitor 36-1, enhancer 32-2, D/A converter 34-2, and right image monitor 36-2.

Before the operation of the structure shown in FIG. 1 is described, the principle of the present invention will now be explained with reference to FIG. 2. In the present invention, special attention has been paid to the fact that the afterimage of a TV camera is most influenced by an image of a frame just previous to the current frame Thus, the afterimage is reduced by performing an arithmetic operation of afterimage reduction for each, pixel of an image, based on the following algorithm:

$$\text{n-th frame image} = I_n - (K \cdot (I_{n-1}))$$

(where In : a pixel value of a given pixel of an n-th frame image,
In−1 : a pixel value of a given pixel of an (n−1)th frame image, and
k : a coefficient (corresponding to the degree of afterimage)

FIGS. 2A to 2C re graphs showing the variation of the afterimage of a TV camera, with the lapse of time. FIG. 2A is a timing chart of X-ray irradiation. FIG. 2B shows a TV camera output, which is free from afterimage. For example, X-ray radiation X3 corresponds to TV camera output I3. FIG. 2C shows a conventional TV camera output which has afterimage. In this case, when the X-ray irradiation is at the timing of X3, the TV output image is represented by a sum of an ideal TV camera output I3 and an afterimage component of the previous frame image I2. This TV camera output is expressed by the following formula TV camera output $(X3) = I3 + k \cdot I2$ Theoretically, when the timing of X-ray irradiation is X3, the TV output image is influenced by the previous frame image I2 as well as the frame image I1 previous to the frame image I2 However, the TV output image is most influenced by the frame image I2. Thus, consideration is given mainly to the previous frame image I2. A predetermined image value component is subtracted from each pixel of each image which is sequentially output from the TV camera, and sequential images after the subtraction processing are displayed on the monitors. Namely, in other words, since the afterimage of the TV camera is most influenced by the previous frame image, a predetermined signal component is subtracted from each image, thus displaying images free from afterimage or ghost image on the monitors.

The operation of the structure shown in FIG. 1 will now be described.

A frame image, which is one of frame images sequentially output from TV camera 10 in a digital form and is, at least, previous one to a frame image to be displayed, is distributed to a right image or a left image by input selector 14 The right image and the left image are stored in first input frame memory 16-1 and second input frame memory 16-2, respectively.

Each pixel of the previous frame right image stored in second input frame memory 16-2 is multiplied by a predetermined coefficient in a section including second multiplier 18-2, second switch 20-2, first register 22-1, second register 22-2, and switch controller 24. First subtracter 26-1 subtracts the obtained multiplied value from the left image to be displayed, which is supplied from input selector 14. Thus, the eft image, which has been subjected to the afterimage reduction processing, is stored in first output frame memory 30-1 through output selector 28.

On the other hand, each pixel of the previous frame left image stored in first input frame memory 16-1 is multiplied by a predetermined coefficient in a section including first multiplier 18-1, first switch 20-1, first register 22-1, second register 22-2, and switch controller 24. Second subtracter 26-2 subtracts the obtained multiplied value from the right image to be displayed, which is supplied from input selector 14. Thus, the right image, which has been subjected to the afterimage reduction processing, is stored in second output frame memory 30-2 through output selector 28.

The left images and right images sequentially stored in first and second output frame memories 30-1 and 30-2 are emphasized by enhancers 32-1 and 32-2 and supplied to the twin monitoring means comprising D/A converter 34-1, left image monitor 36-1, D/A converter 34-2 and right image monitor 36-2. Thus, the left images and right images are alternately displayed. It should be noted that the left image to be displayed is most influenced by the afterimage of the previous right image, and the right image to be displayed is most influenced by the afterimage of the previous left image The above operation may also be understood with reference to FIGS. 3A to 3C. FIG. 3A shows a continuous output of TV camera 10, FIG. 3B shows the left image retained in first input frame memory 16-1, and FIG. 3C shows the right image retained in second input frame memory 16-2.

In FIG. 1, the image processing system for afterimage reduction related to one method of the present invention is built in the twin monitor type stereoscopic television apparatus. It is also possible to incorporate the image processing system into a single monitor type stereoscopic television apparatus.

FIG. 4 is a block diagram shows an example of an image processing system for afterimage reduction related to one method of the present invention and built in a single monitor stereo view apparatus. In this example, output selector 38 distributes the left or right images fed from first and second subtracters 26-1 and 26-2 for each image field The distributed left or right image is stored in output frame memory 30. The left and right images are alternately displayed on monitor 36 through enhancer 32 and D/A converter 34, by a screen-division method.

FIG. 5 is a block diagram showing an example of an image processing system for afterimage reduction related to one method of the present invention and built in a display apparatus for a high-speed movable subject. This system is not designed to produce right and left images, but to process images by using an image to be displayed and its previous image. Namely, this system comprises only one processing system shown in FIG. 1.

FIG. 6 shows a structure in which the enhancers used in the structure of FIG. 1 are omitted. In FIG. 1, enhancer 32-1 is arranged at the rear state of first output frame memory 30-1. However, enhancer 32-1 may be arranged at the front stage of first output frame memory 30-1.

FIG. 7 shows a structure in which the enhancer used in the structure of FIG. 4 is omitted. In FIG. 4, enhancer 32 is arranged at the rear stage of output frame memory 30. However, enhancer 32 may be arranged at the front stage of output frame memory 30.

FIG. 8 shows a structure in which the enhancer shown in FIG. 5 is omitted. In FIG. 5, enhancer 32 is arranged at the rear stage of output frame memory 30, but enhancer 32 may be arranged at the front stage of output frame memory 30.

In the structures shown in FIG. 1 and FIGS. 4 to 8, two coefficient storing registers are provided. However, the number of coefficient storing registers may be one, three or more. Namely, the number of coefficients is not limited to two.

FIG. 9 is a block diagram showing an example of an image processing system for afterimage reduction related to another method of the invention and built in a twin monitor type stereoscopic television apparatus.

In the structures of FIG. 1 and FIGS. 4 to 8, two coefficients are prepared, and one of them is selected so that all pixels are multiplied by the selected coefficient. In the structures of FIG. 9 and FIGS. 11 to 15, two coefficient data groups are prepared in the form of look-up tables (LUTs), and one of the LUTs is selected. One of the coefficients on the selected table, which is determined definitely by the pixel value of the image, is retrieved, and the pixel value is multiplied by the retrieved coefficient.

In FIG. 9, first and second registers 22-1 and 22-2 shown in FIG. 1 are replaced with first and second look-up tables (LUTs) 42-1 and 42-2 each comprising a ROM. The LUTs are switched by switch 40-1, switch 40-2 and switch controller 44.

Twin monitoring means is constituted by enhancer 32-1, D/A converter 34-1, left image monitor 36-1, enhancer 32-2, D/A converter 34-2, and right image monitor 36-2.

As shown in FIG. 10, first and second LUTs 42-1 and 42-2 are designed such that an output coefficient value (ordinate) is definitely determined in relation to an input pixel value (abscissa).

In the structure of FIG. 9, the degree of after-image reduction can suitably been determined in accordance with pixel values based on the density of an input image.

In FIG. 9, an example of an image processing system for afterimage reduction related to another method of the invention is built in a twin monitor type stereoscopic television apparatus. Alternatively, it is possible to incorporate this system in a single monitor type stereoscopic television apparatus.

FIG. 11 is a block diagram showing an example of an image processing system for afterimage reduction related to another method of the invention and built in a single monitor type stereoscopic television apparatus. In this example, output selector 38 distributes left and right images fed from first and second subtracters 26-1 and 26-2 on a field-by-field basis. The distributed images are stored in output frame memory 30. The left and right images are alternately displayed on monitor 36 through enhancer 32 and D/A converter 34 by a screen-division method.

FIG. 12 is a block diagram showing an example of an image processing system for afterimage reduction related to another method of the invention and built in a display apparatus for a high-speed movable subject. This system is not designed to produce left and right images, but to perform image processing by using an image to be displayed and its previous image. This system comprises only one processing system in the structure of FIG. 9.

FIG. 13 shows a structure in which the enhancer shown in FIG. 9 is omitted In the structure of FIG. 9, enhancer 32-1 is arranged at the rear state of first output frame memory 30-1. However, enhancer 32-1 may be arranged at the front stage of first output frame memory 30-1.

FIG. 14 shows a structure in which the enhancer used in the structure of FIG. 11 is omitted. In FIG. 11, enhancer 32 is arranged at the rear stage of output frame memory 30. However, enhancer 32 may be arranged at the front stage of output frame memory 30.

FIG. 15 shows a structure in which the enhancer shown in FIG. 12 is omitted. In FIG. 12, enhancer 32 is arranged at the rear stage of output frame memory 30, but enhancer 32 may be arranged at the front stage of output frame memory 30.

In the structures shown in FIG. 9 and FIGS. 11 to 15, two LUTs for storing two coefficient data groups are provided. However, the number of LUTs may be one, or three, or more. Namely, the number of coefficient data groups is not limited to two.

In the above method and system, a predetermined signal component is subtracted from each image, in consideration of the fact that the afterimage of a TV camera is most influenced by the image of the previous frame. Thus, images free from afterimage can be displayed on the monitor.

What is claimed is:

1. An image processing method for afterimage reduction, comprising the steps of:
   multiplying, by a predetermined coefficient, pixel values of a frame image, which is one of frame images sequentially output from a TV camera system in a digital form and is a previous one to a frame image to be displayed; and
   subtracting the obtained multiplied value from all corresponding pixel values of the frame image to be displayed, thus producing a frame image to be displayed that has been subjected to afterimage reduction processing.

2. The apparatus according to claim 1, further comprising:
   twin monitoring means for alternately displaying the left image of each frame stored in the first output frame memory and the right image of each frame stored in the second output frame memory.

3. The apparatus according to claim 2, wherein at least one monitoring means component of said twin monitoring means includes an enhancer.

4. An image processing system for afterimage reduction, comprising:
   an input selector for alternatively outputting frame images sequentially output from a TV camera system in a digital form, as a right image and a left image;
   a first input frame memory for storing the left image distributed by said input selector;
   a second input frame memory for storing the right image distributed by the input selector;
   coefficient storing means for storing at least one coefficient;
   a first multiplier for multiplying each pixel value of the left image stored in the first input frame memory by one of the coefficients stored in the coefficient storing means;
   a second multiplier for multiplying each pixel value of the right image stored in the second input frame memory by one of the coefficients stored in the coefficient storing means;
   a first subtractor for subtracting an output value of the second multiplier for corresponding pixel values of the left image to be output, which is supplied from the input selector;
   a second subtractor for subtracting an output value of the first multiplier from corresponding pixel values of the right image to be displayed, which is supplied from the input selector;
   an output selector for distributing an output value of the first subtractor and an output value of the second subtractor to the left image and the right image, on a frame-by-frame basis;
a first output frame memory for storing the left image of each frame output from the output selector; and
a second output frame memory for storing the right image of each frame output from the output selector.

5. An image processing system for afterimage reduction, comprising:
an input selector for alternatively outputting frame images sequentially output from a TV camera system in a digital form, as a right image and a left image;
a first input frame memory for storing the left image distributed by said input selector;
a second input frame memory for storing the right image distributed by the input selector;
coefficient storing means for storing at least one coefficient;
a first multiplier for multiplying each pixel value of the left image stored in the first input frame memory by one of the coefficients stored in the coefficient storing means;
a second multiplier for multiplying each pixel value of the right image stored in the second input frame memory by one of the coefficients stored in the coefficient storing means;
a first subtractor for subtracting an output value of the second multiplier from corresponding pixel values of the left image to be displayed, which is supplied from the input selector;
a second subtractor for subtracting an output value of the first multiplier from corresponding pixel values of the right image to be displayed, which is supplied from the input selector;
an output selector for receiving and distributing an output value of the first subtractor and an output value of the second subtractor to a right image field and a left image field which form a frame image to be displayed; and
an output frame memory for storing the right image field and the left image field output from the output selector.

6. The apparatus according to claim 5, further comprising:
single monitoring means for alternately displaying the right image field and the left image field stored in the output frame memory.

7. The apparatus according to claim 6, wherein said single monitoring means includes an enhancer.

8. An image processing system for afterimage reduction, comprising:
an input frame memory for storing a frame image, which is one of frame images sequentially output from a TV camera system in a digital form and is a previous one to a frame image to be displayed;
coefficient storing means for storing at least one coefficient;
a multiplier for multiplying pixel values of the image stored in the input frame memory by one of the coefficients stored in the coefficient storing means;
a subtractor for subtracting an output value of the multiplier from corresponding pixel values of the image to be displayed, which is supplied from the input frame memory; and
an output means memory for storing an output value of the subtractor with respect to each frame image.

9. The apparatus according to claim 8, further comprising:
monitoring means for displaying the image stored in the output frame memory.

10. The apparatus according to claim 9, wherein the monitoring means includes an enhancer.

11. An image processing method for afterimage reduction, comprising the steps of:
multiplying one of the pixel values of a pixel area of a frame image, which is one of frame images sequentially output from a TV camera system in a digital form and is a previous one to a frame image to be displayed, by a coefficient which is determined by said one of the pixel values; and
subtracting the multiplier value from all pixel values of the pixel area of the frame image to be displayed, thus obtaining a frame image to be displayed, which as been subjected to afterimage reduction processing.

12. The method according to claim 11, wherein said pixel area has at least one pixel.

13. An image processing system for afterimage reduction, comprising:
an input selector for alternatively outputting frame images sequentially output from a TV camera system in a digital form, as a right image and a left image;
a first input frame memory for storing the left image distributed by said input selector;
a second input frame memory for storing the right image distributed by the input selector;
coefficient storing means for storing at least one coefficient data group in the form of a look-up table, such that one coefficient is determined in relation to one input pixel value of a pixel area;
a first multiplier for retrieving the coefficient stored in the coefficient storing means in accordance with the pixel values of the pixel area of the left image stored in the first input frame memory, and multiplying the pixel values of the pixel area by the retrieved coefficient;
a second multiplier for retrieving the coefficient stored in the coefficient storing means in accordance with the pixel values of the pixel area of the right image stored in the second input frame memory, and multiplying the pixel values of the pixel area by the retrieved coefficient;
a first subtractor for subtracting an output value of the second multiplier from each pixel value of the left image to be displayed, which is supplied from the input selector;
a second subtractor for subtracting an output value of the first multiplier from each pixel value of the right image to be displayed, which is supplied from the input selector;
an output selector for distributing an output value of the first subtractor and an output value of the second subtractor to the right image and the left image, on a frame-by-frame basis;
a first output frame memory for storing the left image of each frame output from the output selector; and
a second output frame memory for storing the right image of each frame output from the output selector.

14. The system apparatus according to claim 13, wherein said pixel area has at least one pixel.

15. The apparatus according to claim 13, further comprising:

twin monitoring means for alternately displaying the right image of each frame stored in the first output frame memory and the left image of each frame stored in the second output frame memory.

16. The apparatus according to claim 15, wherein at least one monitoring means component of the twin monitoring means includes an enhancer.

17. An image processing system for afterimage reduction, comprising:
   an input selector for alternatively outputting frame images sequentially output from a TV camera system in a digital form, as a right image and a left image;
   a first input frame memory for storing the left image distributed by said input selector;
   a second input frame memory for storing the right image distributed by the input selector;
   coefficient storing means for storing at least one coefficient data group in the form of a look-up table, such that one coefficient is determined in relation to one input pixel value of a pixel area;
   a first multiplier for retrieving the coefficient stored in the coefficient storing means in accordance with the pixel values of the pixel area of the left image stored in the first input frame memory, and multiplying the pixel values of the pixel area by the retrieved coefficient;
   a second multiplier for retrieving the coefficient stored in the coefficient storing means in accordance with the pixel values of the pixel area of the right image stored in the second input frame memory, and multiplying the pixel values of the pixel area by the retrieved coefficient;
   a first subtracter for subtracting an output value of the second multiplier from each pixel value of the left image to be displayed, which is supplied from the input selector;
   a second subtractor for subtracting an output value of the first multiplier from each pixel value of the right image to be displayed, which is supplied from the input selector;
   an output selector for receiving and distributing an output value of the first subtractor and an output value of the second subtractor to a right image field and a left image field which form a frame image; and
   an output frame memory for storing the right image field and the left image field output from the output selector.

18. The apparatus according to claim 17, wherein said pixel area has at least one pixel.

19. The apparatus according to claim 17, further comprising:
   monitoring means for alternately displaying the left image field and the right image field stored in the output frame memory.

20. The apparatus according to claim 19, wherein said monitoring means includes an enhancer.

21. An image processing system for afterimage reduction, comprising:
   an input frame memory for storing a frame image, which is one of frame images sequentially output from a TV camera system in a digital form and is a previous one to a frame image to be displayed;
   coefficient storing means for storing at least one coefficient data group in the form of a look-up table, such that one coefficient is determined in relation to one input pixel value of a pixel area;
   a multiplier for retrieving the coefficient stored in the coefficient storing means in accordance with the pixel values of the pixel area of the image stored in the input frame memory, and multiplying the pixel values of the pixel area by the retrieved coefficient;
   a subtractor for subtracting an output value of the multiplier from each pixel value of the image to be displayed, which is supplied from the input frame memory; and
   an output frame memory for receiving an output value of the subtractor and storing the frame image to be displayed.

22. The apparatus according to claim 21, wherein said pixel area has at least one pixel.

23. The apparatus according to claim 26, further comprising:
   monitoring means for displaying the image stored in the output frame memory.

24. The apparatus according to claim 23, wherein said monitoring means includes an enhancer.

* * * * *